Feb. 11, 1964  P. E. WEBER ETAL  3,121,212
ELECTRODYNAMIC UNDERWATER SOUND SOURCE
Filed March 17, 1960  4 Sheets-Sheet 1

INVENTORS.
PETER E. WEBER
MICHAEL A. HALL
BY
Louis B. Applebaum
ATTORNEY

INVENTORS.
PETER E. WEBER
MICHAEL A. HALL
BY
Louis B. Appleba
ATTORNEY

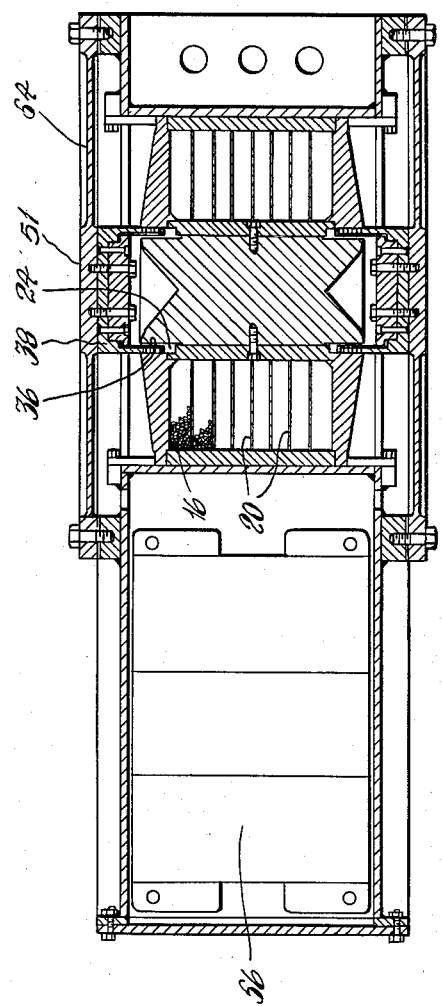

INVENTORS.
PETER E. WEBER
MICHAEL A. HALL
BY

ATTORNEY

3,121,212
ELECTRODYNAMIC UNDERWATER SOUND SOURCE

Peter E. Weber, Scarborough, N.Y., and Michael A. Hall, Berkeley, Calif., assignors, by mesne assignments, to the United States of America as represented by the Secretary of the Navy
Filed Mar. 17, 1960, Ser. No. 15,774
26 Claims. (Cl. 340—12)

This invention relates to an electrodynamic underwater sound source.

The increasing importance of underseas boats in modern warfare has incited activity in the design of devices for the distant detection of underwater objects and in the development of underwater communication systems. One approach to the problem of detection and communication at long underwater distances involves the use of sound radiating and detecting systems. It has been found that the lower sound frequencies exhibit better long-range transmission characteristics than the higher frequencies and are therefore to be preferred.

Sound-generating sources capable of the high power output necessary for the transmission of sound over long underwater distances have been lacking in the range of sound frequencies lying below about 500 cycles per second. The need for high radiated power in long-range work demands a device that provides a fairly long piston stroke and a wide piston diameter. However, at these low frequencies, it is found that when a piston is moved back and forth, a volume of water effectively adheres to the surface of the piston and a large proportion of the force applied to the piston is wasted in moving the inertial mass of this adhering volume of water. The excessive force which must be applied to the piston in order to provide some radiated power above the power that is wasted in moving the inertial mass of the adhering water compels designers to build very large and very heavy machines which, neverthless, wear out rapidly because the excessive force which must be provided burns out the piston-rod bearings and stresses the unit immoderately at other points.

The objects and advantages of the present invention are accomplished by the use of the resonant principle to provide the force necessary to move the inertial mass of the water volume which adheres to the moving piston, thereby reducing the amount of force which must be supplied to the piston and allowing most of this applied force to be converted into useful radiated energy.

In a typical embodiment, piston-like means which may comprise a diaphragm or a piston plate is direct-coupled to a cylindrical coil wound on a coil form which is mounted for movement within the flux gap of an electromagnet. The movement of the coil is caused by the reaction of its time-varying field with the steady or time-invariant field of the electromagnet. (Hereinafter, the time-invariant field of the coil will alteratively be desigated "A.C. field" because it is generated by passage of alternating current through the cylindrical coil and the time-invariant, or steady, field of the electromagnet will alternatively be designated "D.C. field" because it is generated by the passage of direct current through the coil of the electromagnet.) Springs are peripherally attached to the piston-like means, the resonant frequency of the spring system corresponding to the frequency of movement of the piston-like means.

A second piston-like means, coil and spring system, identical with the first, may be located on the side of the electromagnet opposite to the side where the first piston-like means is located, and phased so that the movements of the second piston-like means are opposite to the movements of the first. The opposite phasing of the movements of the two piston-like means balances out the inertial forces introduced by each one.

An object of the invention is to provide a high level of underwater radiated sound power in the frequency range lying below 500 cycles per second.

Another object is to improve the efficiency of long-range underwater sound sources at audio frequencies.

Other objects and many of the attendant advantages of this invention will be readily appreciated as the same becomes better understood by reference to the following detailed description when considered in connection with the accompanying drawings wherein:

FIG. 3 is a cross-sectional view of a second embodiment of the invention; and

FIG. 4 is an expanded view of the coil assembly of FIG. 1, showing the components more clearly.

Figure 1:
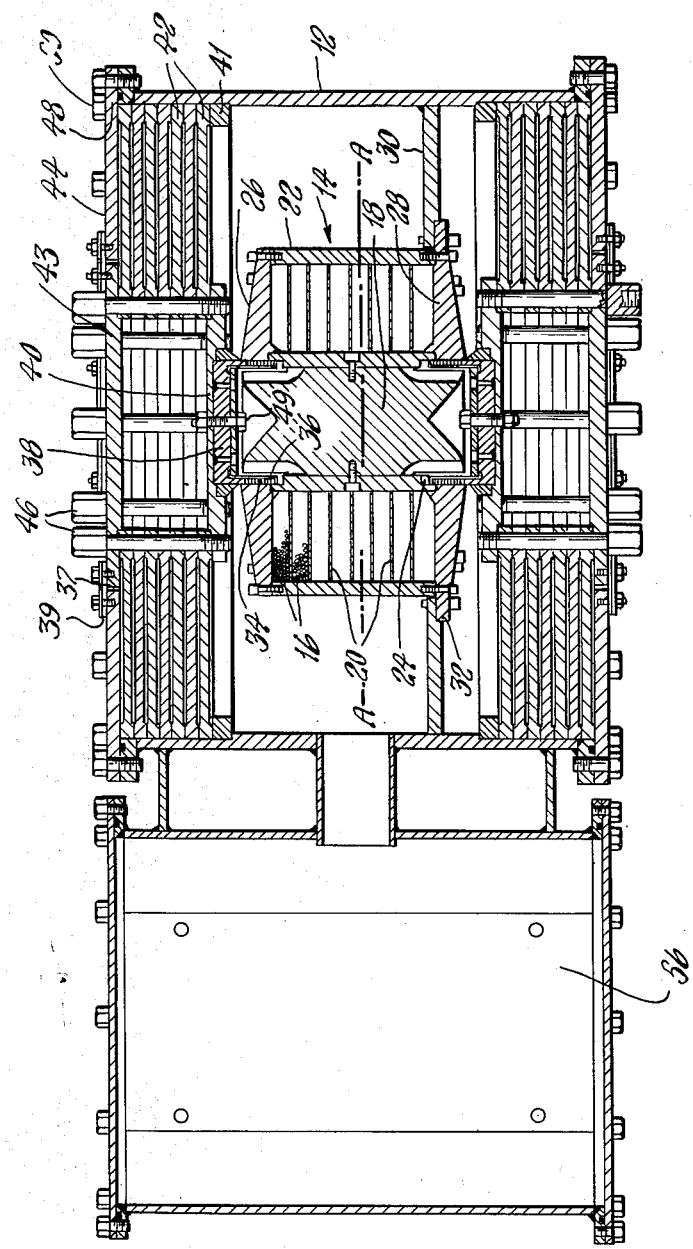
FIG. 1 is a cross-sectional view of an embodiment of the invention.
Figure 2:
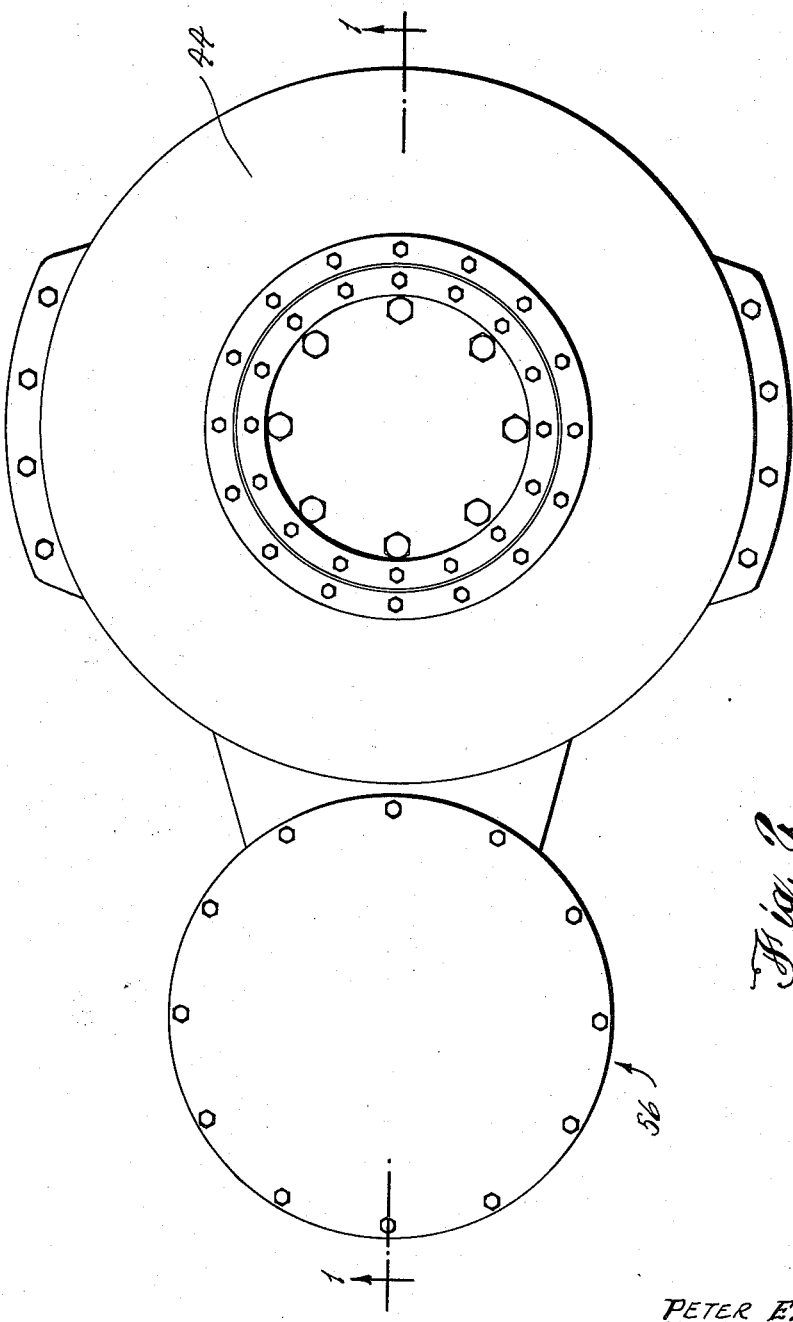
FIG. 2 is a plan view of the embodiment shown in FIG. 1.
Figure 2:
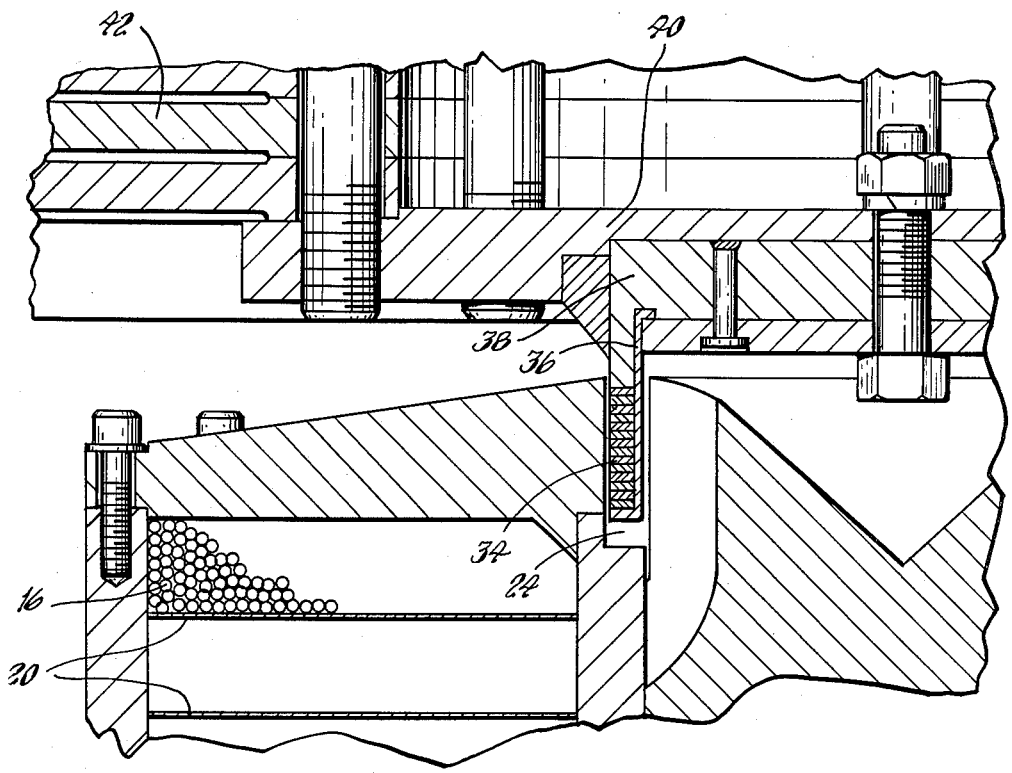

In one embodiment of the invention, a cylindrical housing 12 encloses an electromagnet 14 comprising eight pancake coils 16 (the windings of one coil are partially shown) wound around a central core 18. The coils 16 are separated by copper discs 20 which provide heat transfer paths to the magnet case 22. There are upper and lower circular gaps 24 between the upper and lower sections 26 and 28 of the magnet case 22 and the core 18, the magnet flux being concentrated in the gaps 24. The magnet 14 is supported by a circular plate 30 which extends inwardly from the housing 12, the mounting flange 32 of the magnet being bolted to the supporting plate 30.

Considering only the upper half of the device above the horizontal bisector A—A (since the device is symmetrical above and below this line, the following description applies to the lower half as well as the upper half), a helical coil 34 is wound around a coil form 36 which forms the lower end of a U-shaped cylinder 38. The end of the form 36 around which the coil is wound fits into the flux gap 24. The U-shaped cylinder 38 supports a circular mounting plate 40.

Circular disc springs 42, in this case seven in number, are stacked in horizontal layers above the circular plate 40 and a supporting flange 41, a larger circular cover plate 44 having a circular central excision being placed upon the topmost spring disc. The periphery 48 of the cover plate 44 is affixed to the cylindrical housing 12 by bolts 50, the outer ends of the disc springs 42 being securely retained between the cover plate 44 and the flange 41.

A piston comprising an assembly consisting of a piston plate 43, a mounting plate 40 and bolts 46 is affixed to coil form 36. The innermost ends of the disc springs 42 are sandwiched between and securely retained by the piston plate and the mounting plate. The piston may be said to be directly actuated by the magnetic field forces since there is a direct mechanical coupling between the coil 34 on which the field forces act and the mounting plate 40, i.e., the coil form 36 upon which the coil 34 is wound is bolted to the mounting plate 40 by one or more bolts.

Relative movement between the piston assembly and the cover plate 44 (or, more particularly, between the piston plate 43 and the cover plate 44) is permitted by a compliant member 39, a circular strip of rubber or other waterproof resilient material which is bolted over the gap 37 between the piston plate 43 and the cover plate 44 to prevent entry of water through the gap 37.

The material chosen for the springs was an aluminum alloy because of its low internal damping, lightness, high heat conductivity, high fatigue strength and a modulus of elasticity which fitted the particular physical dimensions of this embodiment. Other materials having similar desirable characteristics may also be employed.

The embodiment shown was designed to produce underwater sound in the 50–150 c.p.s. frequency range with a power input of 600 watts A.C. The mass of the moving mechanical system (pistons, coils, coil forms, circular plates and springs) was about 45 pounds. The total spring stiffness was approximately 146,800 lbs./inch, or 20,900 lbs./inch per disc. Soft iron laminations were used for the magnet core, hot rolled steel plate for the end sections, and 8 inch steel pipe for the magnet case.

The magnet was wound with "Formvar" coated 14-gauge copper wire and the separating discs were of 14-gauge copper. The pancake coils were potted with "Araldite" while being wound in order to fill the air spaces and thus improve heat transfer. The final assembly was also potted for the same reason. The coils were connected in series and maximum safe coil current was 3.5 amperes. The following is a list of the number of turns and the resistance per coil starting from the mounting flange of the magnet:

|   | Turns | Ohms |
|---|---|---|
| 1 | 394 | 2.38 |
| 2 | 510 | 2.83 |
| 3 | 526 | 2.83 |
| 4 | 527 | 2.72 |
| 5 | 524 | 3.10 |
| 6 | 414 | 2.52 |
| 7 | 426 | 2.65 |
| 8 | 395 | 2.47 |

The A.C., or moving, coils 34 were constructed from copper strip insulated with fiberglass tape. The maximum coil current was 90 amps through approximately 0.0158 ohm resistance per coil.

The coil forms were made of plastic (linen-grade Bakelite) and the U-shaped cylinders of stainless steel which was split to prevent eddy currents. Eddy currents and their resultant losses were minimized by splitting the U-shaped cylinder, constructing the cylinder from a nonmagnetic material (stainless steel) and laminating the magnet core.

The piston plates were made of aluminum, although stainless steel and other materials having low internal damping and high fatigue strength can be used.

In operation, an A.C. current of approximately the audio frequency which is to be radiated is fed to the A.C. coils 34 of the device. Since this current may, in the described embodiment, be as much as 90 amperes, it is desirable to feed high voltage-low current electricity to the device from the power supply since the latter may be at a considerable distance from the device. The incoming electricity is then transformed to provide the proper current by a transformer (not shown) which is mounted in a housing 56 affixed to the sound-source housing.

D.C. voltage is applied to the electro-magnet coils 16 to provide D.C. flux across the flux gaps 24. The interactions between the varying A.C. fields and the D.C. field provide the time-varying forces which move the A.C. coils and their associated mechanical masses, including the pistons back and forth in approximate correspondence with the A.C. frequency.

Coarse frequency changes are accomplished by changing the spring stiffness by adding or subtracting spring elements. More precise adjustments of frequency are accomplished by mass loading of the piston plates 43, that is, weights are added to the piston plates. The object of these manipulations is to obtain a resonant condition, in which the frequency of the moving mass is the same as the frequency of the A.C. current, since this is the condition which provides maximum radiated power for a given amount of input power. Resonance of the inertial mass which acts upon each piston plate counteracts the acceleration-restraining effect which the inertial mass has upon the movement of the piston plate. The inertial mass includes the mechanical mass of the piston assembly, etc., as previously mentioned, and the mass of the water volume which adheres to the piston plate as it moves. Maximum radiation of audio power occurs when the frequency at which the piston plate oscillates corresponds precisely to the frequency of the A.C. field (the condition of resonance).

The second embodiment of the invention, which is shown in FIG. 3, avoids the use of separate springs by employing the piston-like means consisting of a diaphragm 51 having a thick central portion and an outer, or peripheral, annular portion 54 of reduced thickness. The central portion (about ¼ of the diameter) corresponds to the piston of the embodiment of FIGURE 1, and the peripheral portion 54, because of its reduced thickness, functions as a disc spring. Actually, part of the peripheral portion nearest the central portion also provides some "piston" action, the effective "piston" diameter being approximately 12 inches for a diaphragm diameter of approximately 24 inches.

Coarse frequency adjustment is made in this embodiment by changing the diaphragm 51 for others of different outer-portion thickness. Fine frequency adjustment is accomplished as before by mass loading of the diaphragm 51.

In both embodiments, the inertial forces produced by movement of the mechanical masses associated with each piston-like means are balanced out by operatnig the two piston-like means in opposite phase, that is, both move outwardly simultaneously and then inwardly simultaneously. This out-of-phase movement is accomplished by connecting the two A.C. coils 34 in series.

It should be noted that in this second embodiment the diaphragm 51 is secured directly to the U-shaped cylinder 38 which supports the A.C. coil 34.

Obviously many modifications and variations of the present invention are possible in the light of the above teachings. It is therefore to be understood that within the scope of the appended claims the invention may be practiced otherwise than as specifically described.

We claim:
1. An underwater sound source comprising, in combination: means for generating a steady magnetic field; means for generating a time-varying magnetic field at such a location that said two fields interact to produce a force field which exerts a time-varying force on said means for generating a time-varying field in accordance with the variations of said time-varying magnetic field; movable means for applying pressure to water; means for coupling said means for generating a time-varying field directly to said pressure applying means to move the latter; and resilient means co-operating with said pressure applying means and tending to cause said pressure applying means to move in resonance with the frequency of said time-varying magnetic field.

2. An underwater sound source comprising, in combination: means for generating a steady magnetic field; means for generating a pair of time-varying magnetic fields of the same frequency in such locations that each said varying field interacts with said steady field to produce a force field which exerts a time-varying force on its associated means for generating a time-varying field in accordance with the variations of said time-varynig magnetic field and is opposite in direction to the time-varying force field produced by the other said varying field; a pair of movable means for applying pressure to water, said pair of movable means being disposed diametrically opposite each other so that they move along the same axis; means for coupling said means for generating time-varying fields directly to said movable means so that the latter move in phase opposition to one another; and resilient means co-operating with said pair of movable means and tending to cause said movable means to move in resonance with the frequency of said time-varying magnetic fields.

3. An underwater sound source comprising, in combination: electrodynamic means comprising means for generating a D.C. magnetic field, and means for generating an A.C. magnetic field at such a location that said two fields interact to produce a force field which exerts a time-varying force on said A.C. field-generating means in accordance with the time variations of said A.C. field; movable means direct coupled to said A.C. field-generating means for applying pressure to water; and resilient means co-operating with said movable means and tending to cause said movable means to move in resonance with the frequency of said A.C. field.

4. An underwater sound source comprising, in combination: electrodynamic means comprising means for generating a D.C. magnetic field, and means for generating a pair of A.C. magnetic fields of the same frequency in such locations that each said A.C. field interacts with said D.C. field to produce a force field which varies in time in accordance with the time variations of the force vectors of said A.C. field, said force field being opposite in direction to the corresponding force vectors produced by the other said A.C. field; a pair of movable means for applying pressure to water, each movable means being direct coupled to said A.C. field-generating means and thus being actuated by one of said time-varying force fields, said pair of movable means being disposed diametrically opposite each other so that they move along the same axis in phase opposition to each other; and resilient means co-operating with said pair of movable means and tending to cause said movable means to move in resonance with the frequency of said A.C. fields.

5. An underwater sound source comprising, in combination: electrodynamic means comprising means for generating a D.C. magnetic field and means for generating an A.C. field at such a location relative to said D.C. field-generating means that said two fields interact to produce a force upon said A.C. field-generating means which varies in time in accordance with the time variations of said A.C. field; and pressure-exerting means for exerting pressure against a water medium, said pressure-exerting means being direct-coupled with said A.C. field-generating means for actuation by said time-varying force and including resilient means peripherally connected to said pressure-exerting means, said resilient means tending to place the inertial mass which affects said pressure-exerting means in mechanical resonance with the frequency of said time-varying force, thereby counteracting the acceleration-restraining effect which said inertial mass exercises on said pressure-exerting means.

6. A source as set forth in claim 5, wherein said pressure-exerting means includes a diaphragm for applying pressure to the water and said resilient means comprises at least one spring co-operating with said diaphragm.

7. A source as set forth in claim 5, wherein said pressure-exerting means includes a diaphragm for applying pressure to the water and said resilient means includes at least one disc spring co-operating with said diaphragm.

8. A source as set forth in claim 5, wherein said pressure-exerting means includes a diaphragm for applying pressure to the water, said diaphragm performing both the pressure-exerting function and the resonating function, said diaphragm being made resilient by forming it with a peripheral section which is thinner than its central portion.

9. An underwater sound source comprising, in combination: electrodynamic means comprising means for generating a D.C. magnetic field and means for generating a pair of A.C. magnetic fields of the same frequency, in such locations that each said A.C. field interacts with said D.C. field to produce a force upon said A.C. field-generating means which varies in time in accordance with the time variations of said A.C. field, said force being opposite in direction to the force produced by the other said A.C. field; and a pair of pressure-exerting means for exerting pressure against a water medium, each said pressure-exerting means being direct-coupled with said A.C. field-generating means for actuation by a different one of said time-varying forces, said pair of pressure-exerting means being disposed diametrically opposite each other so that they move along the same axis in phase opposition to each other, and each said pressure-exerting means including resilient means peripherally connected to said pressure-exerting means, said resilient means tending to place the inertial mass which affects said pressure-exerting means in mechanical resonance with the frequency of said time-varying force, thereby counteracting the acceleration-restraining effect which said inertial mass exercises on said pressure-exerting means.

10. A sound source for a liquid medium comprising, in combination:
    electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;
    piston-like means direct-coupled with said A.C. field-generating means for applying pressure to the liquid medium;
    and resilient means secured to said piston-like means and acting to cause the entire inertial mass of said piston-like means and the volume of liquid adhering thereto to move in resonance with the frequency of said A.C. field.

11. A sound source for a liquid medium comprising, in combination:
    electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;
    piston-like means direct-coupled with said A.C. field-generating means for applying pressure to the liquid medium;
    and resilient means peripherally secured to said piston-like means and acting to cause the entire inertial mass of said piston-like means and the volume of liquid adhering thereto to move in resonance with the frequency of said A.C. field.

12. A sound source for a liquid medium comprising, in combination:
    electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;
    piston-like means direct-coupled with said A.C. field-generating means for applying pressure to the liquid medium;
    and resilient means of disc-like form peripherally secured to said piston-like means and acting to cause the entire inertial mass of said piston-like means and the volume of liquid adhering thereto to move in resonance with the frequency of said A.C. field.

13. A sound source for a liquid medium comprising, in combination:
    electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;
    a piston-assembly direct-coupled with said A.C. field-generating means for applying pressure to the liquid medium;
    and resilient means comprising a disc spring peripherally secured to said piston-assembly, the plane of said disc spring being substantially transverse to the direction of motion of said piston-assembly, said resilient means acting to cause the entire inertial mass of said piston-assembly and the volume of liquid adhering thereto to move in resonance with the frequency of said A.C. field.

14. A sound source for a liquid medium comprising, in combination:

electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;

a piston-assembly direct-coupled with said A.C. field-generating means for applying pressure to the liquid medium;

and resilient means comprising at least two layers of disc springs peripherally secured to said piston assembly, the planes of said disc springs being substantially transverse to the direction of motion of said piston-assembly, said resilient means acting to cause the entire inertial mass of said piston-assembly and the volume of liquid adhering thereto to move in resonance with the frequency of said A.C. field.

15. A sound source for a liquid medium comprising, in combination:

electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;

and piston-like means direct-coupled with said A.C. field-generating means, said piston-like means comprising a diaphragm formed with a peripheral, annular portion which is thinner than the central area, the thinner peripheral portion acting like a disc spring, the resilience of the thinner portion acting to cause the entire inertial mass of said piston-like means and the volume of liquid which adheres thereto to move in resonance with the frequency of said A.C. field.

16. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-like means, each direct-coupled with a different one of said A.C. field-generating means for applying pressure to said liquid medium;

and resilient means secured to said pair of piston-like means and acting to cause the entire inertial mass of each said piston-like means and the volume of liquid adhering thereto to move in resonance with the frequency of its associated A.C. field.

17. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-like means, each direct-coupled with a different one of said A.C. field-generating means for applying pressure to said liquid medium;

and resilient means peripherally secured to said pair of piston-like means and acting to cause the entire inertial mass of each said piston-like means and the volume of liquid adhering thereto to move in resonance with the frequency of its associated A.C. field.

18. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-like means, each direct-coupled with a different one of said A.C. field-generating means for applying pressure to said liquid medium;

and resilient means of disc-like form peripherally secured to said pair of piston-like means and acting to cause the entire inertial mass of each said piston-like means and the volume of liquid adhering thereto to move in resonance with the frequency of its associated A.C. field.

19. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-assemblies, each direct-coupled with one of said A.C. field-generating means for applying pressure to said liquid medium;

and resilient means secured to said pair of piston-assemblies and acting to cause the entire inertial mass of each said piston-assembly and the volume of liquid adhering thereto to move in resonance with the frequency of said A.C. field.

20. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-assemblies, each direct-coupled with one of said A.C. field-generating means for applying pressure to said liquid medium;

and resilient means peripherally secured to said pair of piston-assemblies and acting to cause the entire inertial mass of each said piston-assembly and the volume of liquid adhering thereto to move in resonance with the frequency of said A.C. field.

21. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-assemblies, each direct-coupled with one of said A.C. field-generating means for applying pressure to said liquid medium;

and resilient means of disc-like form peripherally secured to said pair of piston-assemblies and acting to cause the entire inertial mass of each said piston-assembly and the volume of liquid adhering thereto to move in resonance with the frequency of said A.C. field.

22. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition; and a pair of piston-like means, each direct-coupled with a different one of said A.C. field-generating means for applying pressure to said liquid medium, each said piston-like means comprising a diaphragm formed with a peripheral, annular portion which is thinner than the central area, the thinner peripheral portion acting like a disc spring, the resilience of the thinner portion acting to cause the entire inertial mass of its associated piston-like mass and the volume of liquid adhering thereto to move in resonance with the frequency of its associated A.C. field.

23. A sound source for a liquid medium comprising, in combination:

electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;

piston-like means direct-coupled with said A.C. field-generating means for applying pressure to the liquid medium;

and resilient means comprising at least two layers of disc springs secured to said piston-like means and acting to cause the entire inertial mass of said piston-like means and the volume of liquid adhering thereto to move in resonance with the frequency of said A.C. field.

24. A sound source for a liquid medium comprising, in combination:

electrodynamic means comprising means for generating a D.C. magnetic field and means for generating an A.C. magnetic field at such a location that said two fields interact to produce a force field which exerts a time-varying force upon said A.C. field-generating means in accordance with the variations of said A.C. field;

piston-like means direct-coupled with said A.C. field-generating means for applying pressure to the liquid medium;

and resilient means comprising at least two layers of disc springs peripherally secured to said piston-like means and acting to cause the entire inertial mass of said piston-like means and the volume of liquid adhering thereto to move in resonance with the frequency of said A.C. field.

25. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-assemblies, each direct-coupled with one of said A.C. field-generating means for applying pressure to said liquid medium;

and resilient means secured to said pair of piston-assemblies, said resilient means comprising layers of disc springs, the plane of said disc springs being substantially transverse to the direction of motion of said piston-assemblies, said resilient means acting to cause the entire inertial mass of each said piston-assembly and the volume of liquid adhering thereto to move in resonance with the frequency of its associated A.C. field.

26. A sound source for a liquid medium comprising, in combination:

means for generating a D.C. magnetic field and a pair of means for generating an A.C. magnetic field, said A.C. field-generating means being spaced from each other along the same axis, each A.C. field interacting with said D.C. field to produce a separate force field which exerts a time-varying force upon its associated A.C. field-generating means, the two time-varying forces being in phase opposition;

a pair of piston-assemblies, each direct-coupled with one of said A.C. field-generating means for applying pressure to said liquid medium;

and resilient means peripherally secured to said pair of piston-assemblies, said resilient means comprising layers of disc springs, the plane of said disc springs being substantially transverse to the direction of motion of said piston-assemblies, said resilient means acting to cause the entire inertial mass of each said piston-assembly and the volume of liquid adhering thereto to move in resonance with the frequency of its associated A.C. field.

References Cited in the file of this patent

UNITED STATES PATENTS

| | | |
|---|---|---|
| 1,333,298 | Evershed et al. | Mar. 9, 1920 |
| 1,507,171 | Hahnemann et al. | Sept. 2, 1924 |
| 1,557,048 | Hahnemann | Oct. 13, 1925 |
| 1,604,693 | Hecht et al. | Oct. 26, 1926 |
| 1,610,674 | Hahnemann et al. | Dec. 14, 1926 |
| 1,808,149 | Smith | June 2, 1931 |
| 1,984,383 | Russel | Dec. 18, 1934 |
| 2,832,843 | Miessner | Apr. 29, 1958 |
| 2,903,673 | Harris | Sept. 8, 1959 |
| 2,978,669 | Harris | Apr. 4, 1961 |